US006578798B1

(12) United States Patent
Dizdarevic et al.

(10) Patent No.: US 6,578,798 B1
(45) Date of Patent: Jun. 17, 2003

(54) AIRLIFTING SURFACE DIVISION

(76) Inventors: Faruk Dizdarevic, 3300 W. Lincoln Ave., #129, Anaheim, CA (US) 92801; Mithad Dizdarevic, 3300 W. Lincoln Ave., #129, Anaheim, CA (US) 92801

( * ) Notice: Subject to any disclaimer, the term of this patent is extended or adjusted under 35 U.S.C. 154(b) by 0 days.

(21) Appl. No.: 10/118,839

(22) Filed: Apr. 8, 2002

(51) Int. Cl.[7] .............................. B64C 23/06; B64C 5/00
(52) U.S. Cl. ...................... 244/199; 244/198; 244/91; 244/35 R
(58) Field of Search ................................ 244/198–199, 244/91, 34 R, 35 R

(56) References Cited

U.S. PATENT DOCUMENTS

| 3,027,118 | A | * | 3/1962 | Willox |
| 3,270,988 | A | | 9/1966 | Cone |
| 4,046,336 | A | * | 9/1977 | Tangler ...................... 244/198 |
| 4,205,810 | A | | 6/1980 | Ishimitsu |
| 4,245,804 | A | | 1/1981 | Ishimitsu |
| 4,477,042 | A | | 10/1984 | Griswold, II |
| 4,545,552 | A | | 10/1985 | Welles |
| 4,671,473 | A | | 6/1987 | Goodson |
| 4,674,709 | A | | 6/1987 | Welles |
| 4,722,499 | A | | 2/1988 | Klug |
| 5,082,206 | A | * | 1/1992 | Kutschenreuter et al. |
| 5,348,253 | A | | 9/1994 | Grutzer |
| 5,634,613 | A | | 6/1997 | McCarthy |
| 5,992,793 | A | * | 11/1999 | Perry et al. .................. 244/199 |
| 6,168,383 | B1 | * | 1/2001 | Shimizu |

FOREIGN PATENT DOCUMENTS

| CH | 684588 | 10/1994 |
| DE | 19706668 | 9/1998 |
| DE | 19752369 | 5/1999 |

* cited by examiner

*Primary Examiner*—Michael J. Carone
*Assistant Examiner*—Lulit Semunegus

(57) ABSTRACT

This airlifting surface division idea provides for division of airlifting surfaces resulting in low induced and interference drag. It can be applied to aircraft wings and helicopter and windmill rotor blades to significantly reduce induced drag when compared to prior art. Also, it can be used for new concepts of large subsonic and hypersonic aircraft to significantly reduce their overall drag and external dimensions when compared to prior art, simultaneously providing for very good pitch maneuver and longitudinal stability of such aircraft.

4 Claims, 15 Drawing Sheets

DETAIL "A"
SECTION II-II

DETAIL "B"
SECTION I-I

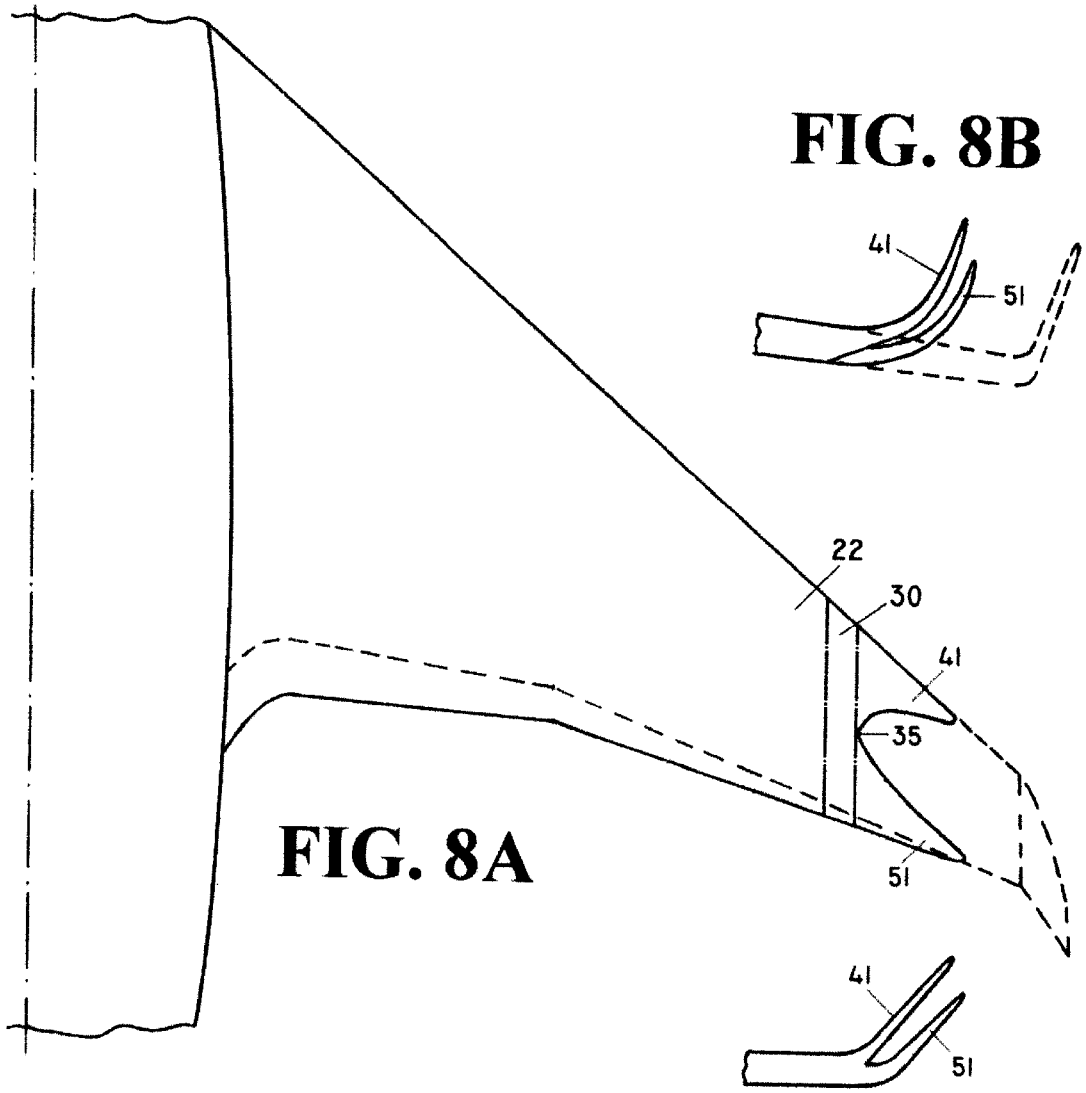

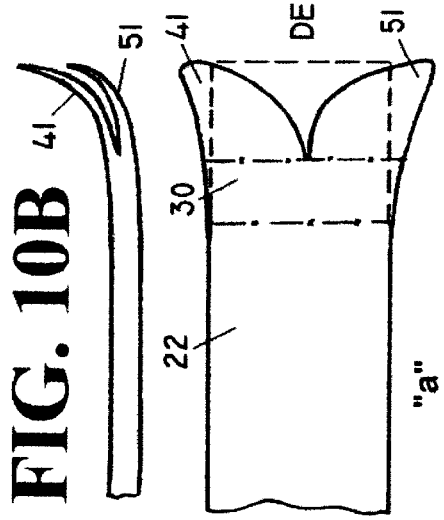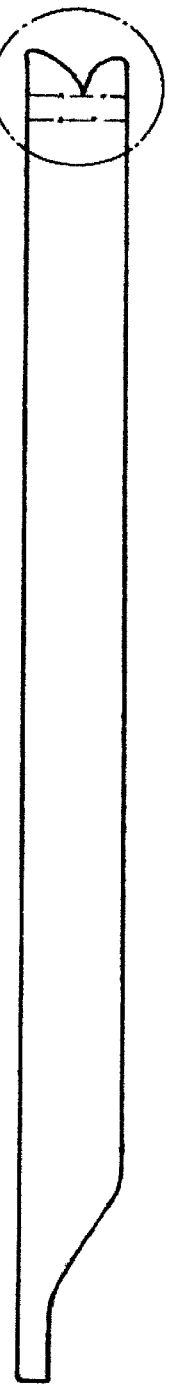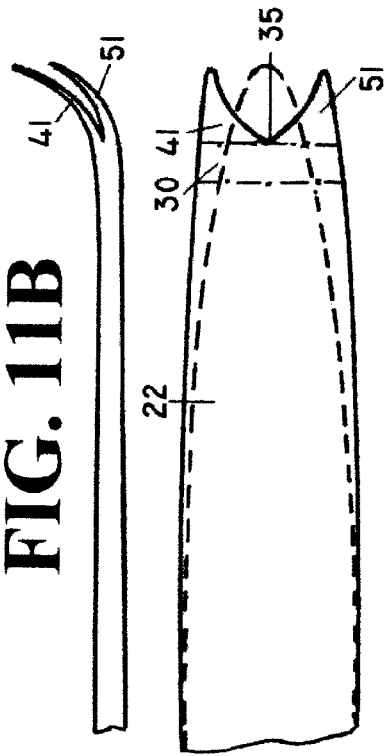
FIG. 10C
FIG. 10B
FIG. 10A
FIG. 11B
FIG. 11A

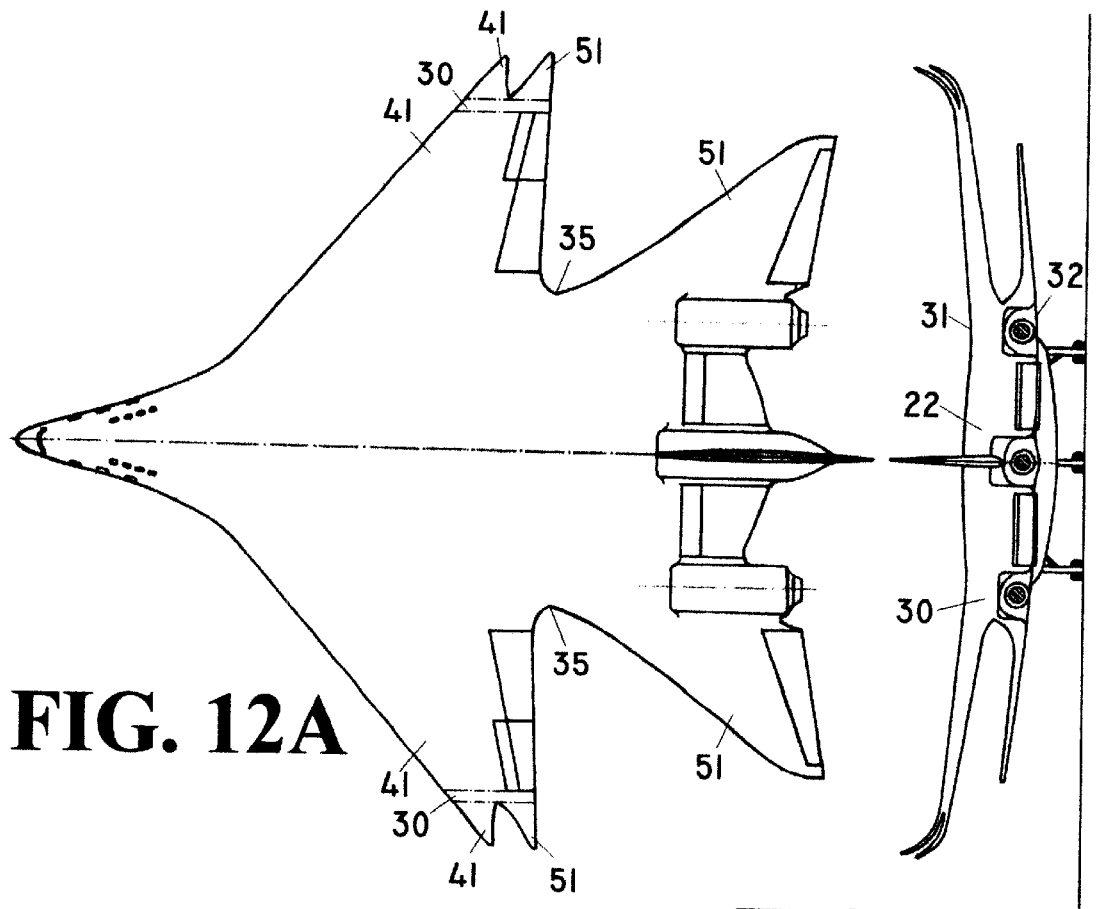
FIG. 12A
FIG. 12C
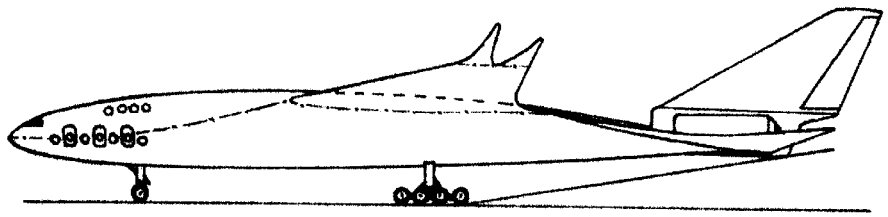
FIG. 12B

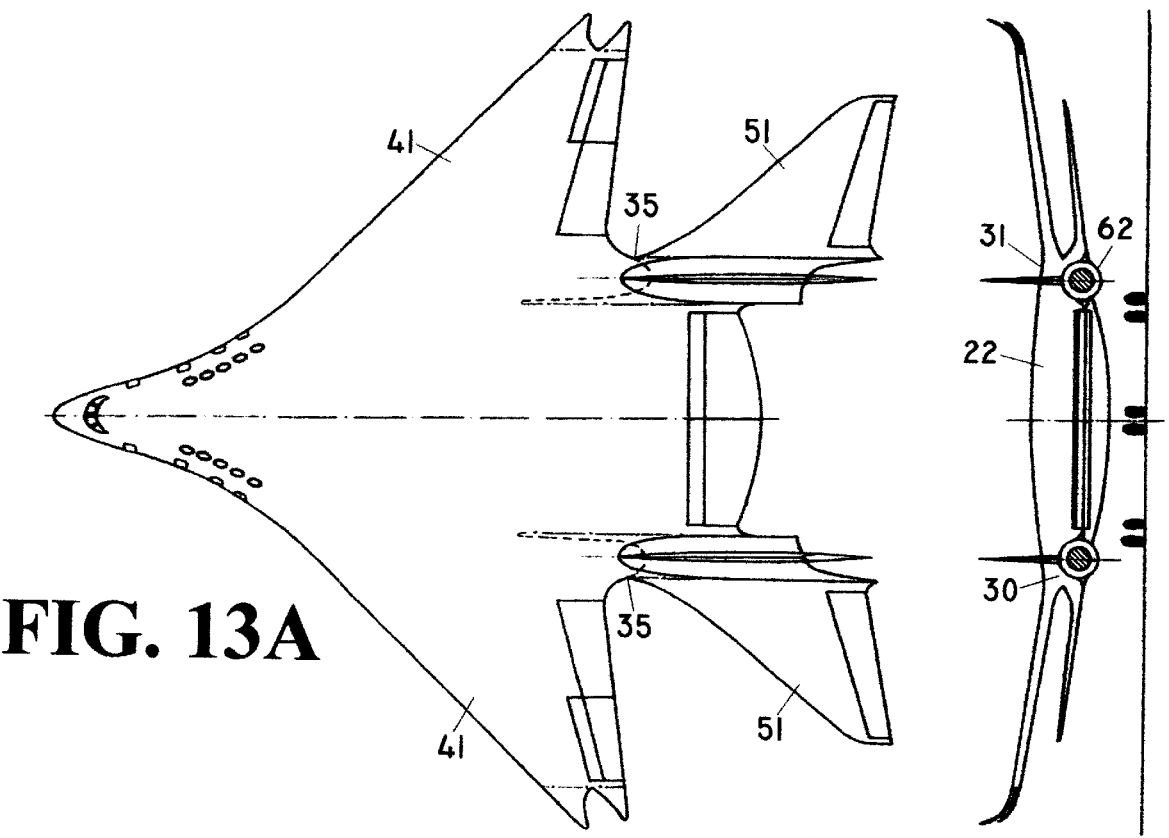
FIG. 13A
FIG. 13C
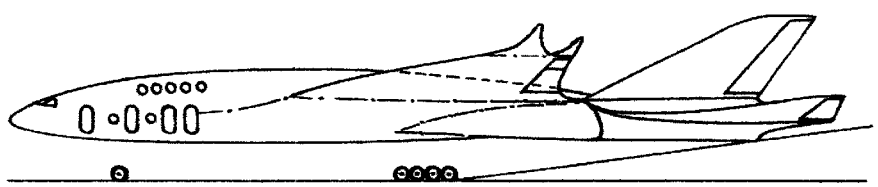
FIG. 13B

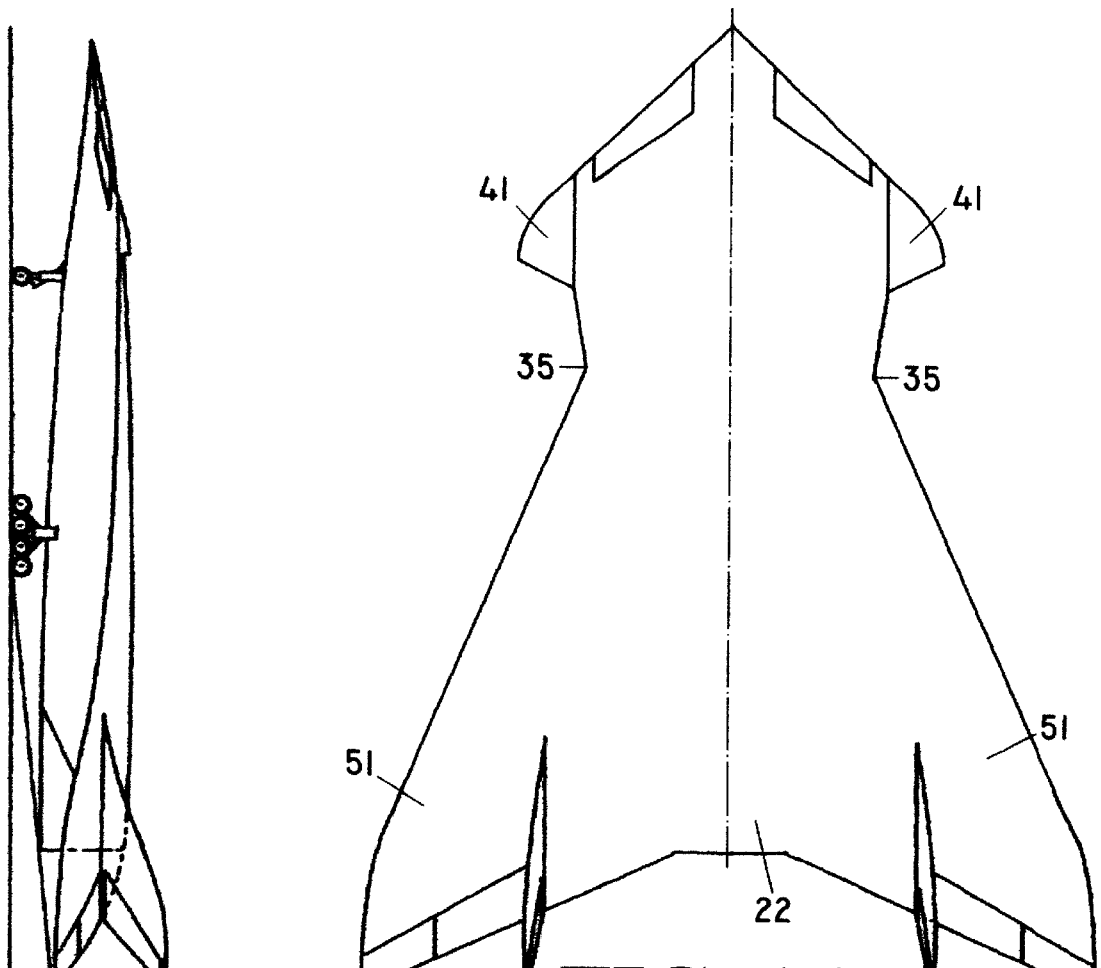
FIG. 16B  FIG. 16A
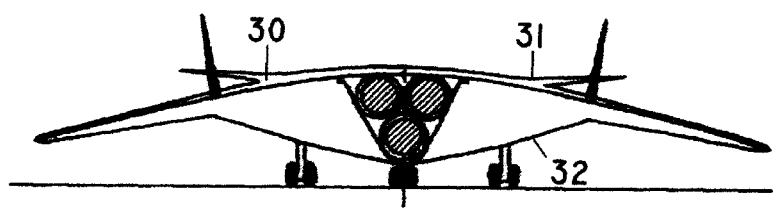
FIG. 16C

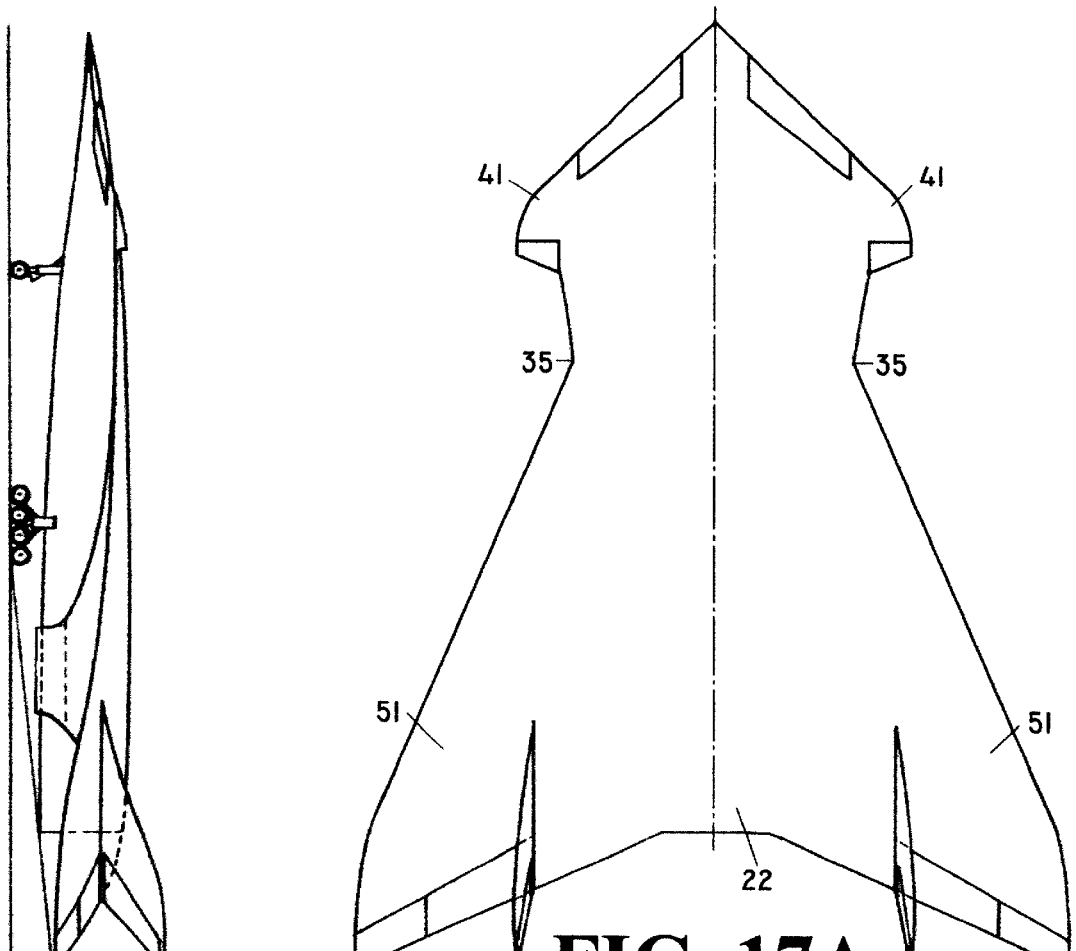
FIG. 17B  FIG. 17A
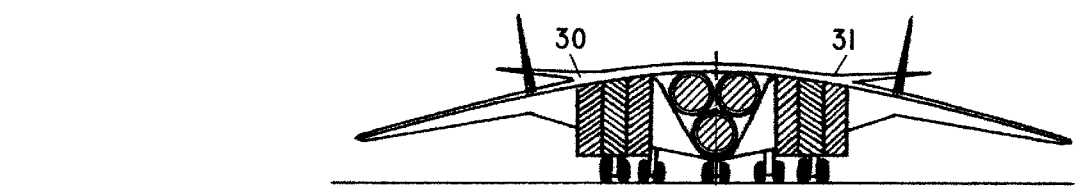
FIG. 17C

AIRLIFTING SURFACE DIVISION

BACKGROUND OF THE INVENTION

This invention relates to the means for reduction of induced drag on the airlifting surfaces of aircraft, helicopters, and windmills. Further more, this idea provides for design of new flying-wing-concept aircraft with sufficient payload space, increased longitudinal stability and maneuverability, and reduced profile and wave drag at high subsonic, as well as supersonic speeds when compared to the existing flying-wing-concept aircraft.

Induced drag on the lifting surfaces, which is generated on the tips thereof due to pressure difference between their lower and upper surfaces, represents a significant problem especially with highly loaded lifting surfaces where the ratio between aircraft weight and wing surface area is high.

Extensive theoretical and practical research showed that induced drag on the tips of airlifting surfaces depended on the square of lift coefficient, as well as the shape and aspect ratio of the airlifting surfaces. The most favorable shape is the elliptical one. However, it is not used often due to its geometry definition and related manufacturing complexity. The increase of airlifting surface aspect ratio is limited due to resulting unfavorable structural loading and requires increase in structural weight, which further requires higher attack angles of the airlifting surfaces to produce extra lift necessary to carry additional weight, whereby resulting in induced drag increase.

Due to above reasons, for the past couple of decades, efforts to solve this problem have been concentrated to modify the tips of airlifting surfaces similar to birds with low-aspect-ratio wings. Efforts to solve the problem of induced drag on the tips of lifting surfaces have been done in three different ways:

a) By sweeping back the tip of airlifting surfaces with significant narrowing and tilt thereof upward or downward.
b) By creating a net of smaller airlifting surfaces at the tip of the main airlifting surface
c) By splitting the tips of airlifting surfaces to a number of smaller airlifting surfaces The following patents relate to the ways of solving the problems of induced drag as reflected under a):

U.S. Pat. No. 5,634,613 discloses a highly swept leading edge of the tip of an airlifting surface, which is tilted downwardly and simultaneously significantly narrowed. Tilting the tip of the airlifting surface downward will not produce significant positive effects on reduction of induced drag since induced drag is caused mostly by low pressure being created on the upper U.S. Pat. No. 4,477,042 discloses similarly a tip of an airlifting surface that is tilted, however upwardly, which is more favorable. All of these solutions just marginally reduce induced drag.

U.S. Pat. No. 4,205,810 discloses a winglet that is tilted upwards at 90-degree angle relatively to the wing chord plane. The winglet extends along three-quarters of the wing tip chord length starting from aft portion thereof The significant difference in the air pressure at the forward wing tip portion between the upper and under wing surface will initiate vortex formation, which will not be suppressed by the winglet since the forward wingtip portion is not bound by the winglet. The 90-degree angle between the upper surface of wing and the winglet will cause turbulence, which will cause additional interference drag.

U.S. Pat. No. 4,245,804 eliminates some of the shortcomings pertinent to U.S. Pat. No. 4,205,810 by adding a forward strake to the winglet, which extends along the forward wingtip portion. Also, the winglet is tilted relative to the vertical plane for an angle Ø with a transition area between the upper surface of wing and the winglet, thereby partially reducing both induced and interference drag.

U.S. Pat. No. 5,348,253 eliminates further some of the shortcomings of the U.S. Pat. No. 4,245,804 by having a transition section inserted between the main portion of wing and the winglet, which curves upwards and extends along the entire wing tip chord. The transition is used for increased lift production and additional reduction of both induced and interference drag.

The following patents relates to the ways of solving the problems of induced drag as reflected under b):

U.S. Pat. No. 4,671,473 discloses a number of winglets that are pivotally connected to the main wing tip and have adjustable sweep and attack angle. In addition to the problems arising from the complexity of mechanisms necessary to manipulate with winglets and difficulties related to the space available for the disposal of such mechanisms inside the thin wing tip portion of the main wing, a significant interference drag is generated between the main lifting portion and winglets, as well as among densely distributed winglets especially at higher flight speed when the attack angles of winglets are low and consequently the slots among them are narrow. This disclosure is practically inapplicable to the aircraft that fly at high speed.

Similarly, Patent No. CH 684588 A5 discloses a net of winglets being mutually connected that have ability to be extracted and retracted from and into the main wing respectively. Interference drag among winglets is eliminated when winglets are retracted into the main wing, but this solution is not satisfactory due to added weight and the complexity of the method for retraction and extraction of winglets.

U.S. Pat. No. DE 19706668 A1 discloses a net of winglets mutually connected to an aerodynamically profiled rod that is connected to the wing tip. Winglets are mutually dispersed in the vertical plane thereby reducing interference drag especially at the winglets tips. However, the problems of interference drag between the rod and the winglets, the rod and the wing, and the problem of rod drag itself still remained.

The following patents relate to the ways of solving the problems of induced drag as reflected under c):

U.S. Pat. Nos. 4,545,552 and 4,674,709 disclose tips of a lifting surface being split to forward and aft winglet sections that curve and extend in the opposite directions in the vertical plane where the forward and aft winglets are additionally provided with movable surfaces for pitch, yaw, and roll control. However, these patents do not define a method for split and formation of two separate airfoils from a single airfoil at the tip of lifting surface in order to avoid sudden transition and high interference drag.

Patent No. DE 19752369 A1 discloses a tip of a lifting surface that is split into curved forward and aft sections and then reconnected again forming a closed loop. This disclosure is favorable from the aspect of aerodynamic loading and rigidity of split tips, but it is complex from the manufacturing aspect. Also, it does not disclose how the tips of lifting surfaces are split in order to reduce the interference drag, which is also the case with U.S. Pat. No. 4,545,552 and 4,674,709.

U.S. Pat. No. 4,722,499 discloses a tip of a lifting surface being split into two winglets and tilted in vertical plane in the opposite directions by inserting an "aerodynamic boom"

between a wing and the winglets. This disclosure is similar to the one in Patent No. DE 19706668, but it has additional formers in the area where winglets are connected to the aerodynamic boom for the purpose of interference drag reduction. The winglet that is oriented downward does not give as positive drag reduction effects as it is the case with the winglet that is oriented upwards. Aerodynamic boom additionally increases weight and drag.

U.S. Pat. No. 3,270,988 of Sep. 6, 1966 treats highly loaded surfaces of wings with standard aspect ratio by suggesting to split wing tips in a number of smaller winglets that are lined up in the direction of airflow, differentially arched, and rigidly joined the wing's main section, thereby achieving a wing tip configuration similar to the one of eagle during gliding, which significantly reduces induced drag relatively to the conventional wing with the same span and surface area. However, the inventor does not offer any vision or a concrete idea, or a suggestion as to how to perform such a wing division on real constructions in order to avoid turbulence and high interference drag in the division area, as well as flow separation on the wing's upper surface with simultaneous preservation of wing tip aerodynamic efficiency.

Tendencies to eliminate huge parasite drag, which is created by the aircraft fuselage, led to the idea of "flying wing" where wings have been used for payload accommodation. However, this idea is facing two key problems in practical terms:
How to provide for sufficient height and volume for passenger and payload accommodation using airfoils of standard relative thickness
How to provide for sufficient longitudinal stability and maneuverability Some of the early flying wing designs filed due to insufficient longitudinal stability, which resulted in crashes. This significantly slowed down further development of this idea. The first next practical attempt in this direction was B-2 aircraft. The B-2 design was characterized with thin airfoils adapted for a relatively high speed of flight. These airfoils are deformed and thickened in the cockpit area. Insufficient longitudinal stability was compensated for by programmable computerized systems to maintain longitudinal stability under different flight regimes, which certainly does not meet civil aviation regulation requirements.

The next significant project based on the flying wing idea, which is still in the design phase, is the Blended Wmg Body aircraft (BWB). It is designed for civil aviation (transport of up to 800 passengers) and has large dimensions (wing span of 87 m and length 49 m) with a maximum relative thickness of airfoils between 17 and 20 percent in the passenger accommodation area, which is significantly shifted towards the leading edge. That is very unfavorable at high subsonic speed at which long-range aircraft fly. The wings of BWB have a large span, which is unfavorable with regard to aerodynamic loading and manipulation at airports. The realistic gravity center position of the BWB aircraft cannot provide for the level of longitudinal stability and pitch maneuver required by the civil aviation rules. The future of this project is uncertain due to problems previously described.

BRIEF SUMMARY OF THE INVENTION

My "Airlifting-Surface-Division" idea provides for the following advantages and applications:
a) Significant reduction of the induced drag on the tips of aerodynamic surfaces such as aircraft wings, helicopter, and windmill rotor blades with very slight increase in weight and parasitic drag.
b) Significant increase in the longitudinal stability and maneuverability of the aircraft based on the flying wing idea.
c) Providing for sufficient payload space with significant reduction of profile and wave drag due to ability to use thin laminar and supersonic airfoils at high subsonic and supersonic speeds for aircraft based on the flying wing idea.

Accordingly, besides the objects and advantages of the patents described above in my patent application, several objects of my "Airlifting-Surface-Division" idea are:
1. Significantly reduce induced drag on the tips of airlifting surfaces at high attack angles and thereby:
   Provide for the high aerodynamic efficiency on the tips of airlifting surfaces
   Minimize induced and interference drag by means of the new shape of airlifting surfaces tips.
2. Provide for required longitudinal stability, which is regulated by the civil aviation rules for the aircraft designed on the flying wing idea and, simultaneously, provide for a good pitch maneuver with relatively small stabilizing and maneuvering surfaces.
3. Provide for sufficient payload space for the aircraft designed on the flying wing idea and simultaneously minimize profile and waive drag at high subsonic or supersonic speeds.
4. Reduce wing span of large aircraft, especially aircraft designed on the flying wing idea, in order to improve maneuver on runways and provide for better access to the boarding gates at airports.
5. Reduce wing span of the classic-concept aircraft in order to minimize wing weight, which would result either in reduced fuel consumption or increased range or payload.

Still further objects and advantages will become apparent from a consideration of the ensuing description and drawings.

Although the description contains many specifics, these should not be construed as limiting the scope of the invention but as merely providing illustrations of some of the presently preferred embodiments of this invention.

Thus the scope of the invention should be determined by the appended claims and their legal equivalents, rather than by the examples given.

SHORT DESCRIPTION OF DRAWINGS

Figure 7C:
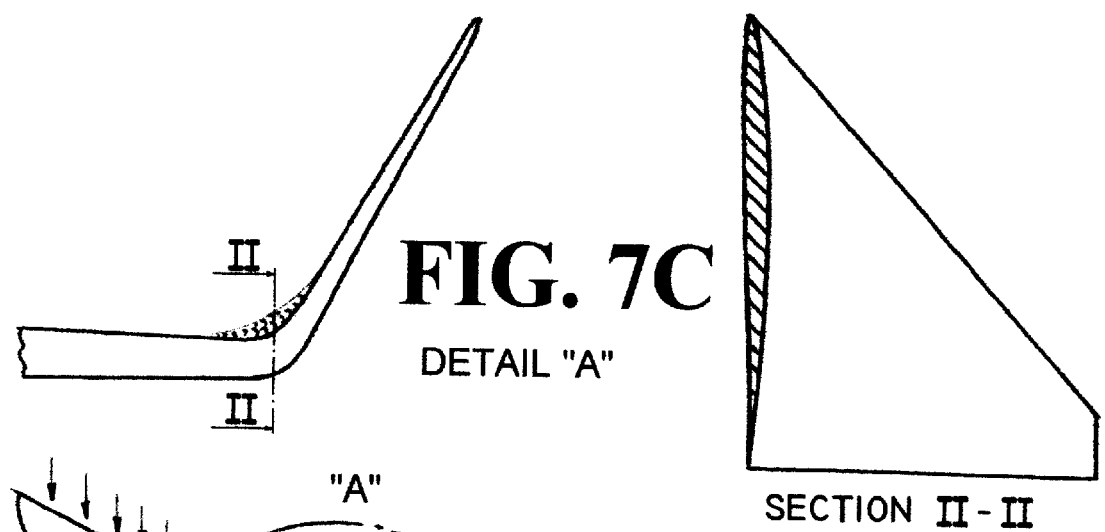
Figure 7A:
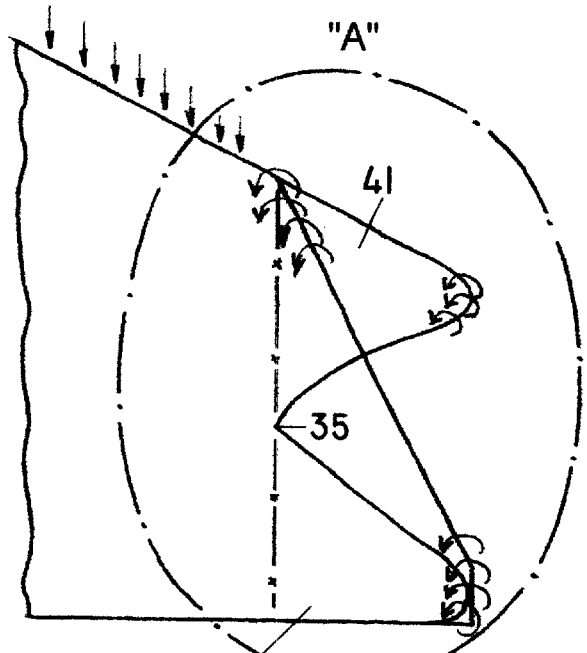
Figure 7B:
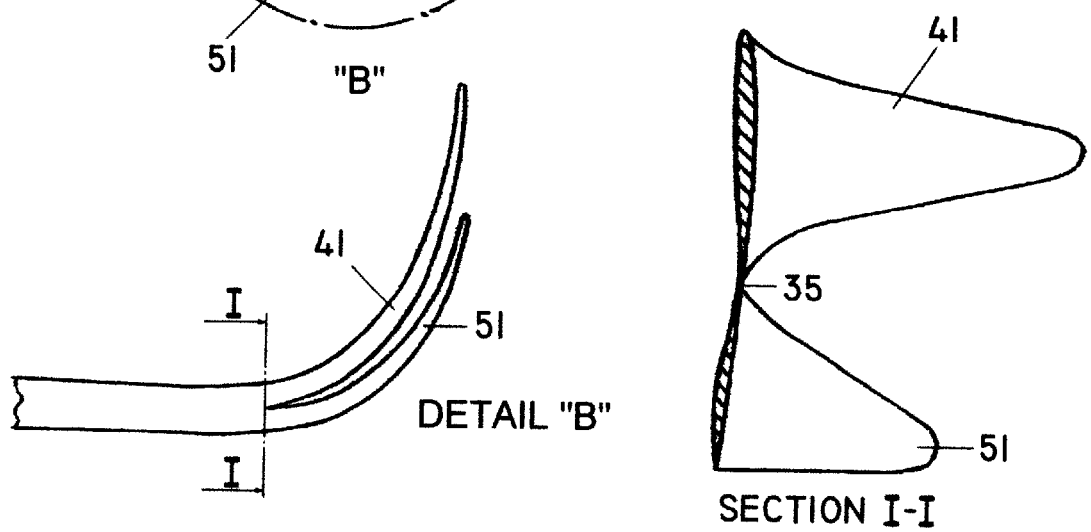

FIG. 7 compares an airlifting surface with the single winglet with an airlifting surface whose tip is divided into a leading and a following winglet.

FIG. 8 shows one of the applications of the "Airlifting-Surface-Division" idea on the aircraft wing.

Figures 9A, 9B:
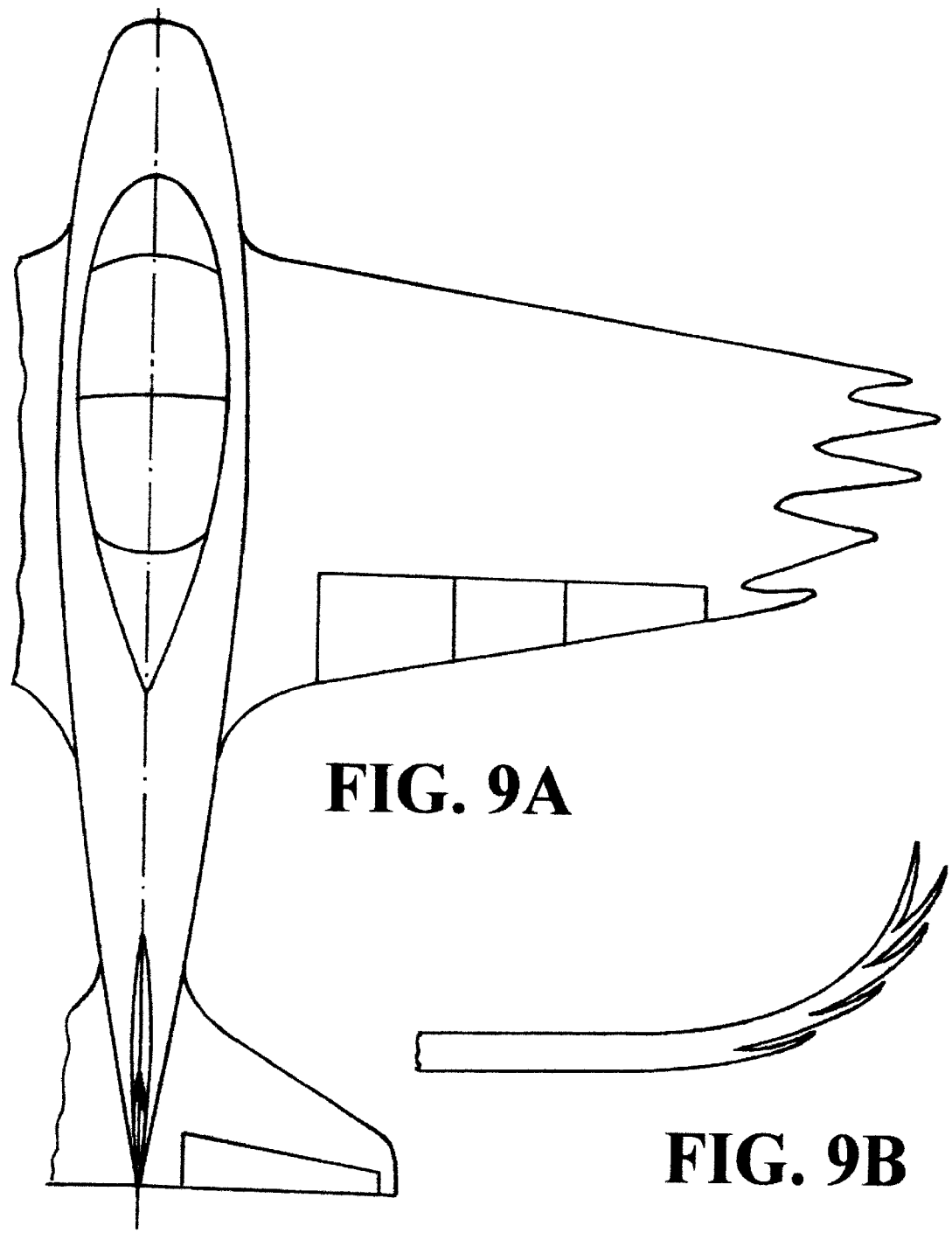

FIG. 9 how an aircraft wing design with a multiple wing division for special purpose aircraft.

FIG. 10 shows an application of the "Airlifting-Surface-Division" idea on helicopter rotor blades.

FIG. 11 shows an application of the "Airlifting-Surface-Division" idea on windmill rotor blades.

FIG. 12 shows a new aircraft concept for subsonic speeds based on the "Airlifting-Surface-Division" idea.

FIG. 13 shows a new aircraft concept for subsonic speeds based on the "Airlifting-Surface-Division" idea with a possibility to integrate a jet engine within aircraft structure.

Figure 14:
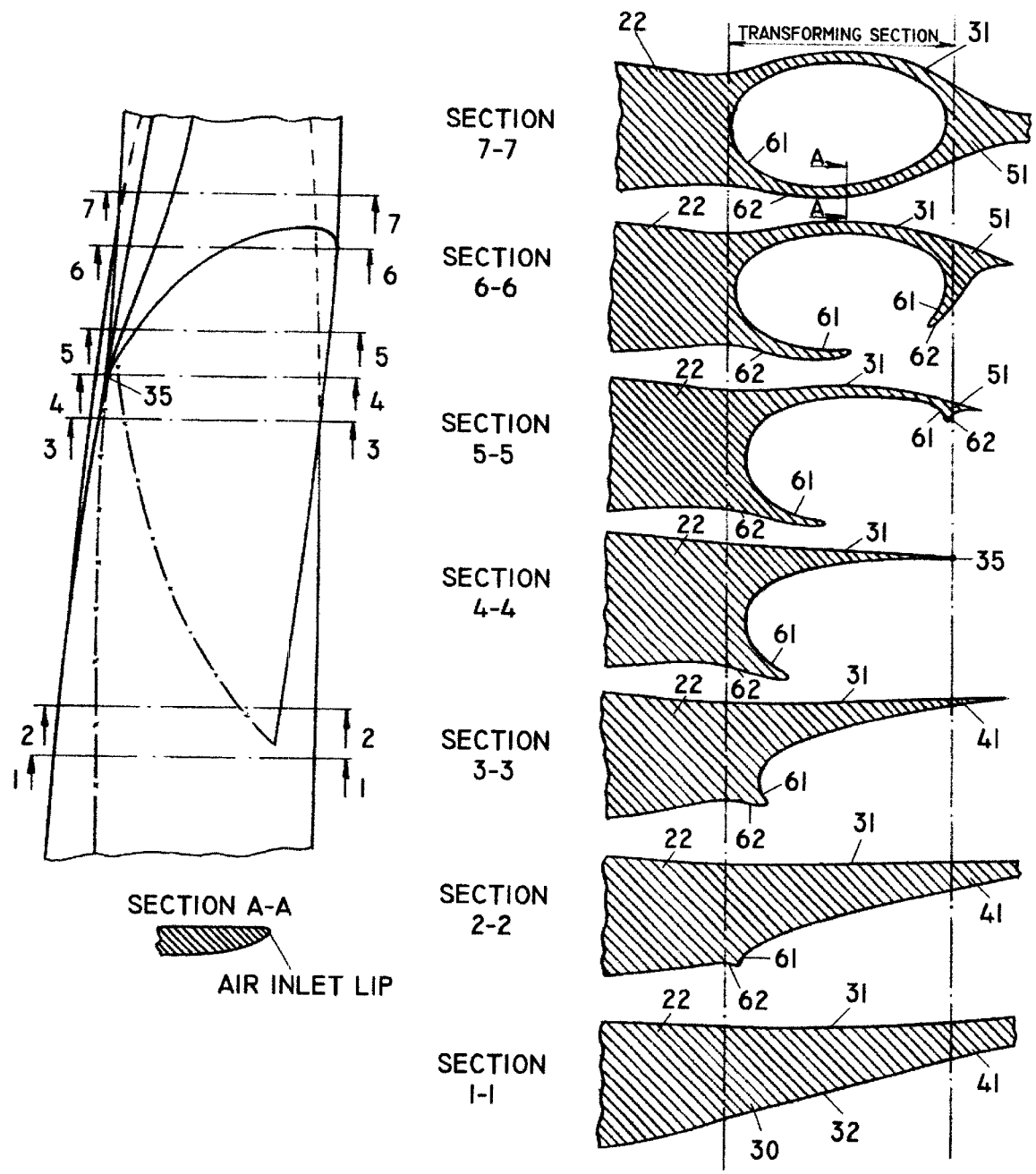

FIG. 14 shows a method for air inlet formation on the aircraft that is shaped for subsonic speeds and on the "Airlifting-Surface-Division" idea.

Figure 15B:
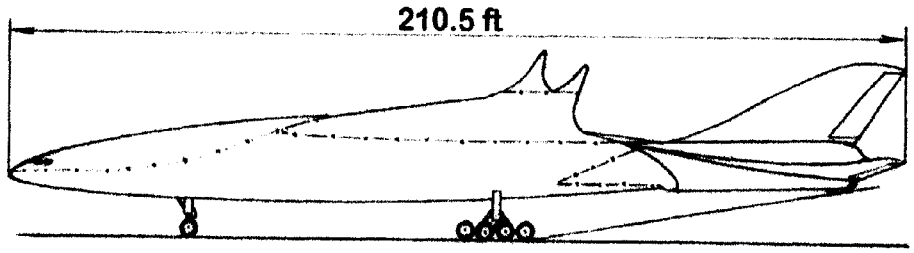
Figure 15A:
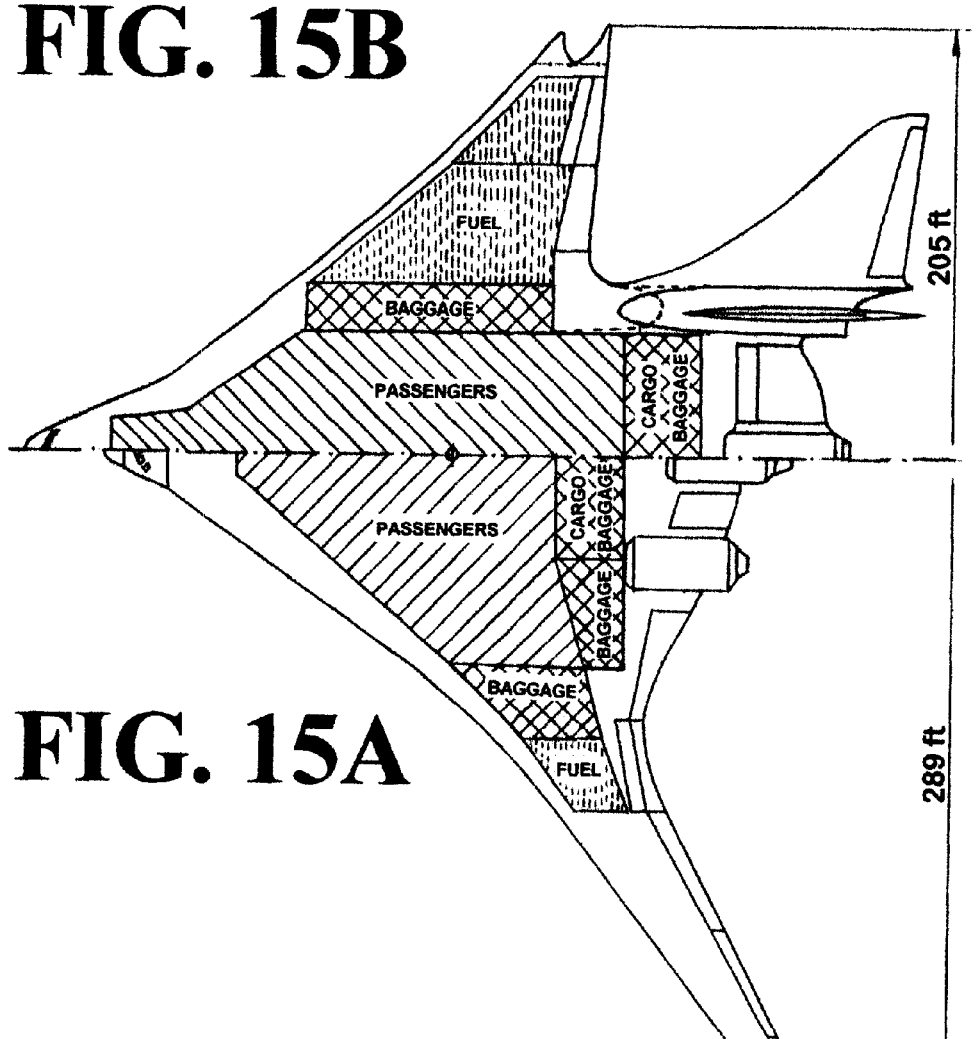
Figure 15C:
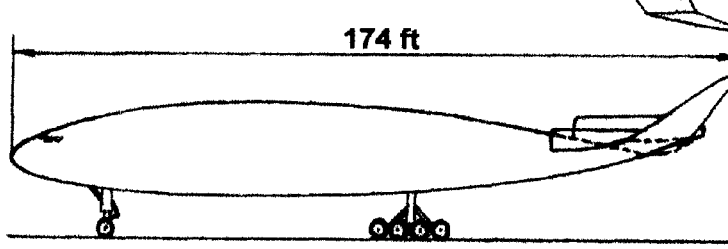

FIG. 15 depicts comparative features between Blended Wing Body aircraft and an aircraft based on "Airlifting-Surface-Division" idea.

FIG. 16 shows a new concept of an aircraft for supersonic and hypersonic speeds that is based on the "Airlifting-Surface-Division" idea.

FIG. 17 shows a new concept of the aircraft for supersonic and hypersonic speeds that is based on the "Airlifting-Surface-Division" idea with a possibility of ramjet and scramjet engine integration.

REFERENCE NUMERALS IN DRAWING 22 main section
23 main section upper surface
24 main section under surface
25 main section leading edge
26 main section trailing edge
27 family of main section airfoils
28 main section root airfoil
29 main section outboard end airfoil
30 transforming section
31 transforming section upper surface
32 transforming section under surface
33 transforming section leading edge
34 transforming section trailing edge
35 point of division
36 transforming section inboard end airfoil
37 transforming section outboard end airfoil
38 leading airfoil
39 following airfoil
40 family of transforming section airfoils
41 leading section
42 leading section upper surface
43 leading section under surface
44 leading section leading edge
45 leading section trailing edge
46 leading section root airfield
47 leading section tip airfoil
48 family of leading section airfoils
49 leading section aft strake
50 trailing edge of the leading section aft strake
51 following section
52 following section upper surface
53 following section under surface
54 following section leading edge
55 following section trailing edge
56 following section root airfoil
57 following section tip airfoil
58 family of following section airfoils
59 following section forward strake
60 leading edge of the following section forward strake
61 inner portion of transforming section under surface
62 outer portion of transforming section under surface

DETAILED DESCRIPTION OF THE INVENTION

FIGS. 1 to 6 show a method of division of an airlifting surface in two or more smaller sections.

Figure 1:
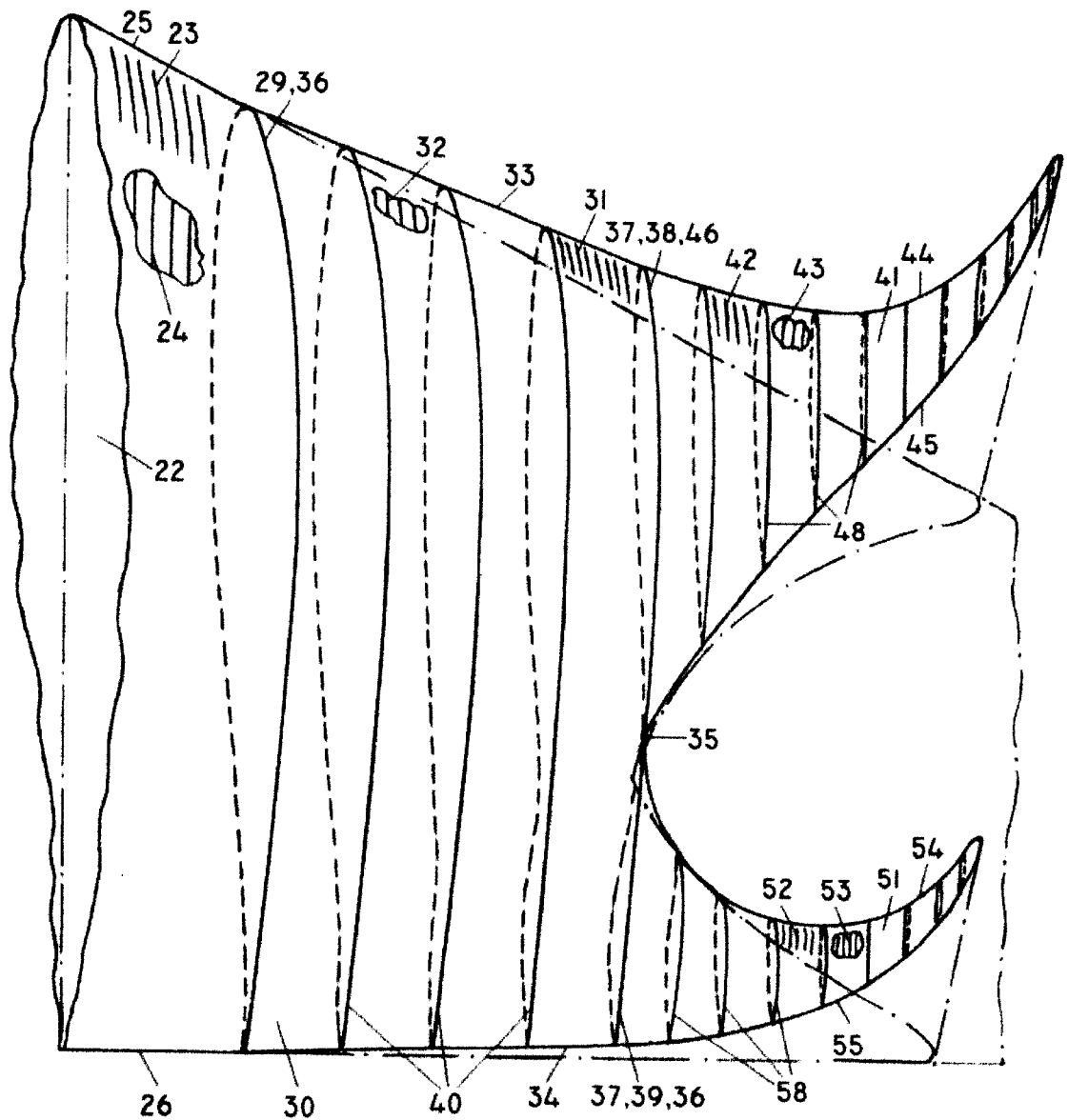
FIG. 1 shows a method of division of an airlifting surface being shaped by subsonic airfoils.

FIG. 1 shows an airlifting surface that is shaped for subsonic and transonic speed and divided into two smaller sections. The division of the airlifting surface is done by inserting transforming section 30 between main section 22 on one side and leading section 41 and following section 51, which were formed as the result of airlifting surface division, on the other side.

FIG. 1 also shows a family of transforming section airfoils 40 that are disposed between transforming section inboard end airfoil 36 and transforming section outboard end airfoil 37. Family of transforming section airfoils 40 together with transforming section inboard end airfoil 36 and transforming section outboard end airfoil 37 form transforming section upper surface 31 and transforming section under surface 32.

Transforming section inboard end airfoil 36 coincides and is identical to main section outboard end airfoil 29. Transforming section upper surface 31 and transforming section under surface 32 are coming in contact tangentially with main section upper surface 23 and main section under surface 24 respectively. Transforming section outboard end airfoil 37 is divided in leading airfoil 38 and following airfoil 39. Leading airfoil 38 and following airfoil 39 are coming in contact in point of division 35.

Transforming section upper surface 31 has a smooth continuous curvature to retain laminar airflow over the upper side of transforming section 30.

Transforming section under surface 32 is being gradually and progressively deformed from transforming section inboard end airfoil 36 to transforming section outboard end airfoil 37 so that two convex and one concave curvature in between are formed in the direction of airflow. The vertex of the concave curvature, from transforming section inboard end airfoil 36 to transforming section outboard end airfoil 37, is gradually approaching transforming section upper surface 31 and shifting towards point of division 35 in the direction of airflow. On the outboard end of transforming section 30, in point of division 35, the vertex of the concave curvature of transforming section under surface 32 is coming tangentially in contact with transforming section upper surface 31, thereby dividing the airlifting surface practically in a single plane and a single point avoiding three-dimensional airflow in the area of division.

Figure 4:
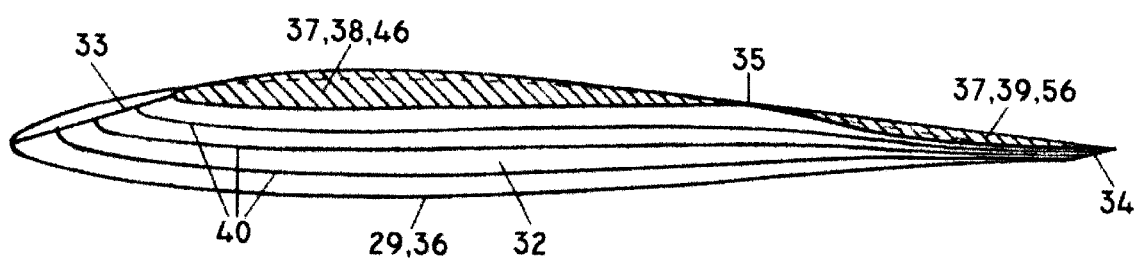
FIG. 4 shows a transforming section under surface of an airlifting surface being shaped by subsonic airfoils.

In order to avoid a depression and increased air pressure in the concavity zone of transforming section under surface 32 and reduce the air pressure difference between transforming section upper surface 31 and transforming section under surface 32 and thereby reduce vortex initializations in the area of airlifting surface division, transforming section leading edge 33 and transforming section trailing edge 34 are continually arching upward whereby simultaneously reducing the curvature of transforming section upper surface 31 and the frontal convex curvature of transforming section under surface 32. The optimal shape of transforming section 30 is possible to determine by varying above-mentioned parameters and testing models in a wind tunnel. FIG. 4 shows transforming section under surface 32 where the depression in the concavity zone and flow separation is already avoided at 0.7° attack angle of the airlifting surface.

Figure 2:
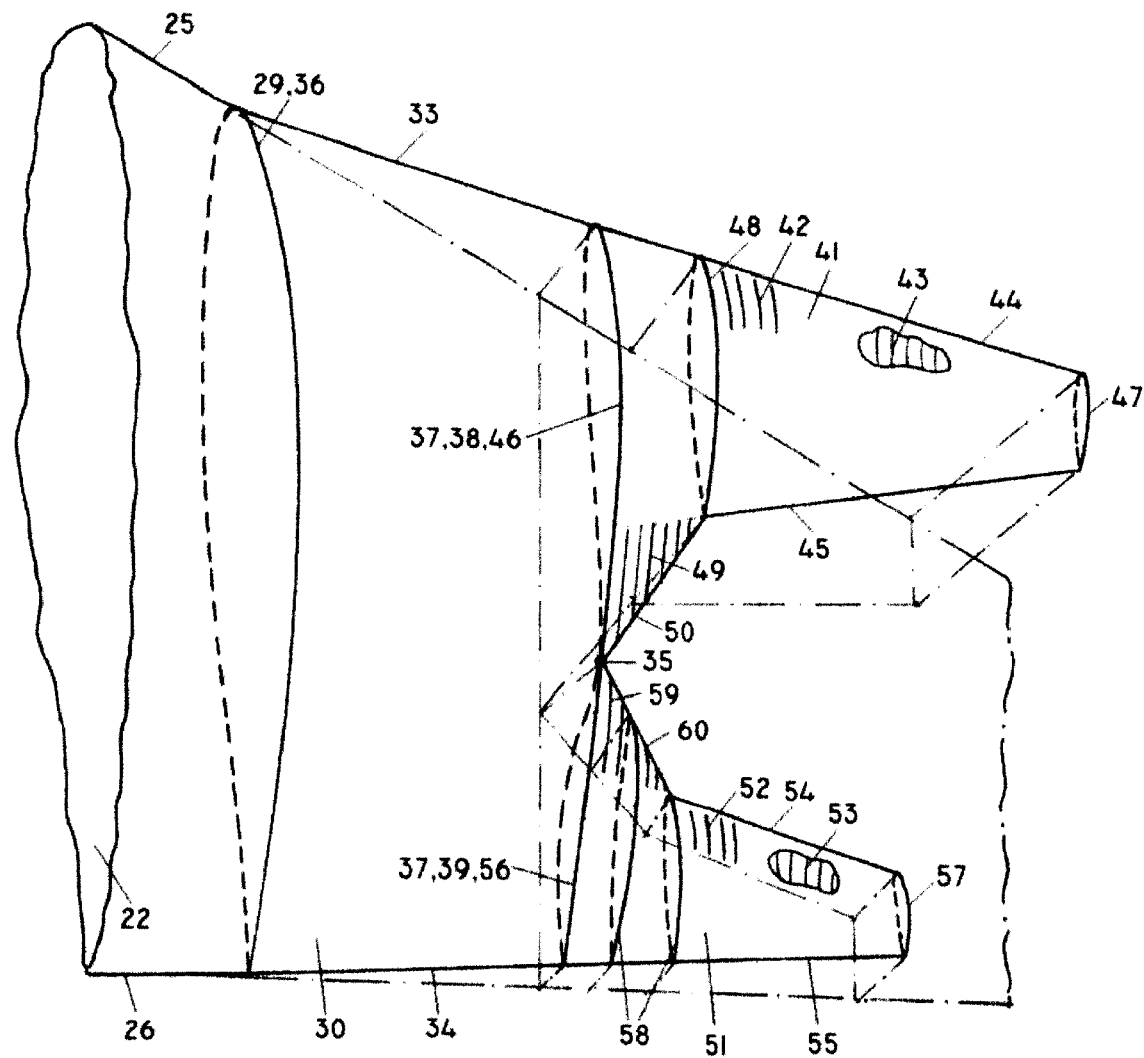
FIG. 2 shows airlifting surface sections created upon division of the airlifting surface in a more detailed fashion.

FIG. 2 shows in details leading section 41 and following section 51. Leading section 41 is connected to transforming section 30 so that leading section root airfoil 45 is coincidental and identical to leading airfoil 38. Leading section upper surface 42 and leading section under surface 43 are coming in contact tangentially with transforming section upper surface 31 and transforming section under surface 32 respectively.

Following section 51 is connected to transforming section 30 so that following section root airfoil 55 coincides with following airfoil 39 of transforming section 30. Following section root airfoil 55 and following airfoil 39 are identical to each other. Following section upper surface 52 and following section under surface 53 are coming in contact tangentially with transforming section upper surface 31 and transforming section under surface 32 respectively.

In the area near point of division 35, leading section aft strake 49 and following section forward strake 59 are formed. Trailing edge of leading section aft strake 50 and leading edge of the following section forward strake 60 are joined together in point of division 35.
Leading section aft strake 49 and following section forward strake 59 must have such a shape that:
1. They reduce the initiation of vortices in the area around point of division 35.
2. Following section 51 does not lie on the path of the disturbed airflow behind leading section 41.
3. Leading section 41 and following section 51 are set to their optimal attack angles.

Figure 3:
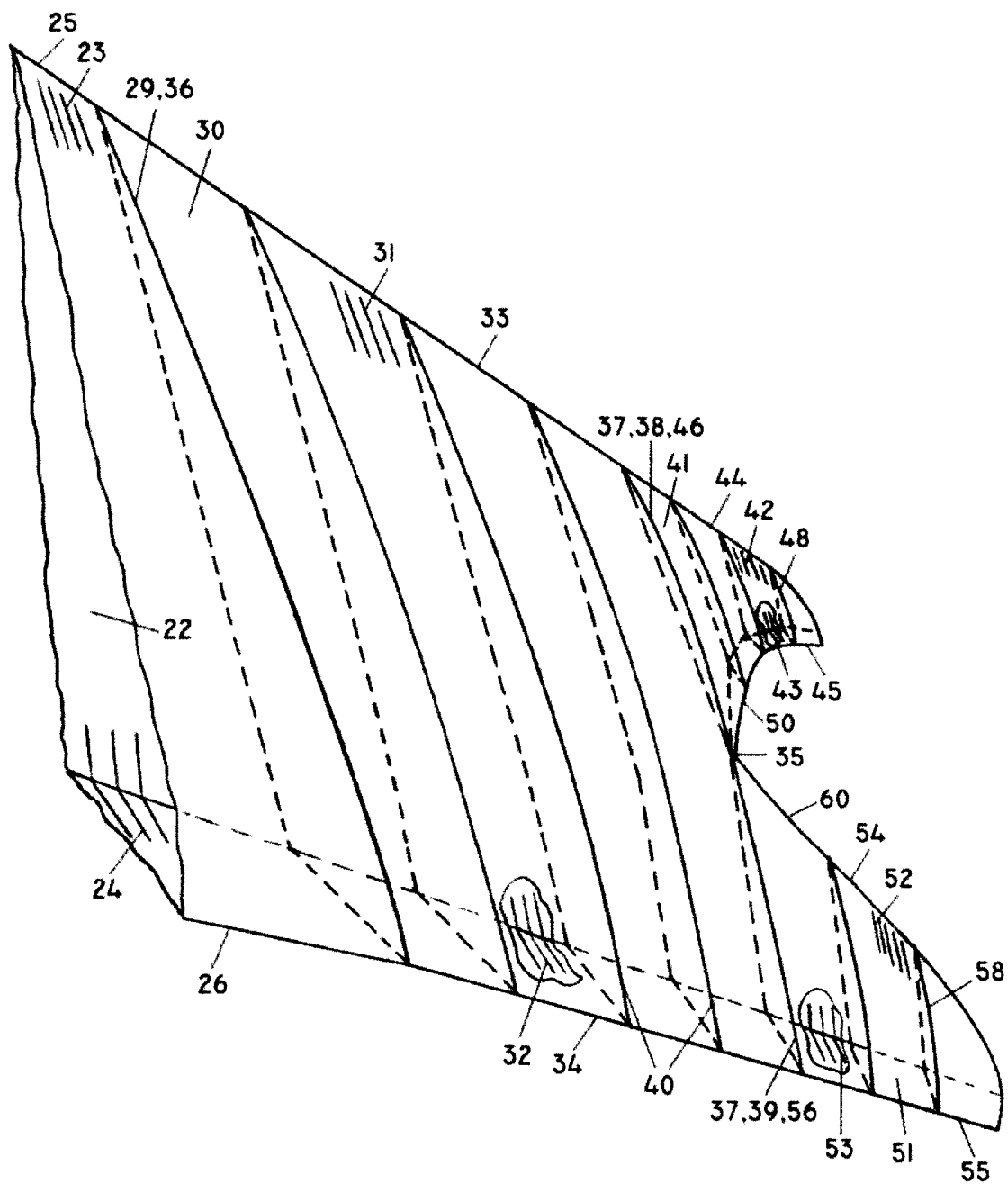
FIG. 3 shows a method of division of an airlifting surface being shaped by hypersonic airfoils.
Figure 5:
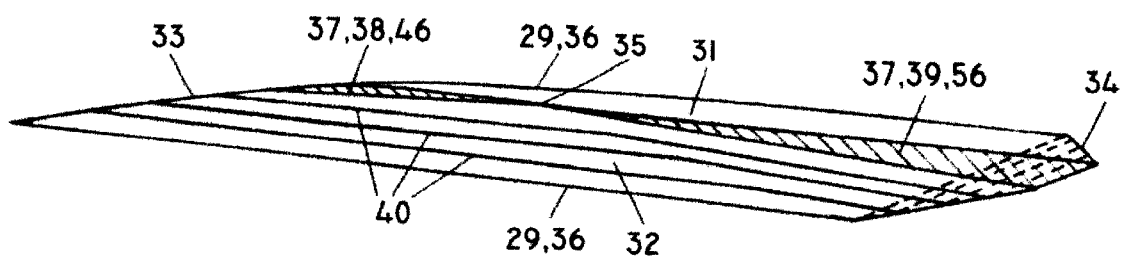
FIG. 5 shows a transforming section under surface of an airlifting surface being shaped by hypersonic airfoils.

FIGS. 3 and 5 show the manner of division of airlifting surfaces shaped by supersonic and hypersonic airfoils. The division principle is similar to the division principle for airlifting surfaces being shaped by subsonic airfoils. Namely, transforming section 30 is inserted between main section 22 on one side and leading section 41 and following section 51 on the other side. The difference in the division of the airlifting surfaces shaped by hypersonic airfoils when compared to subsonic airfoils is in the manner by which transforming section under surface 32 is transformed due to different shapes of subsonic and hypersonic airfoils, as well as different ways in which airflow behaves at subsonic and hypersonic speeds.

Hypersonic airfoils have a sharp leading edge with a very low angle between their upper and lower camber line. The upper camber line of hypersonic airfoils is generally slightly curved or broken, while the lower camber line is sharply curved or broken near the trailing edge thereof The similar pattern should be kept with family of transforming section airfoils 40. For this reason, family of transforming section airfoils 40 retains a sharp convex bend of the lower camber line near the trailing edge thereof. The lower camber line of family of transforming section airfoils 40, between their leading edge and the above-mentioned convex bend, has a concave bend whose vertex position is gradually approaching the upper camber line from transforming section inboard end airfoil 36 to transforming section outboard end airfoil 37 and shifting in the direction of airflow towards point of division 35.

In order to provide for the most favorable shape and position of leading airfoil 38, the vertex of the upper camber line of family of transforming section airfoils 40 is gradually shifting forward in the direction of airflow, from transforming section inboard end airfoil 36 to transforming section outboard end airfoil 37, while transforming section leading edge 33 and transforming section trailing edge 34 are simultaneously arching upward and downward respectively relatively to the main section chord plane.

In point of division 35, the concavity vertex of the lower camber line of transforming section outboard end airfoil 37 comes in contact with the upper camber line thereof, thereby dividing it into leading airfoil 38 and following airfoil 39. Leading airfoil 38 has a flat or slightly curved lower camber, while following airfoil 39 has the same shape as family of main section airfoils 27. Leading section root airfoil 45 is identical to leading airfoil 38, and following section root airfoil 56 is identical to following airfoil 39.

The upper camber line of all the sections' airfoils should be slightly curved, not broken, in order to provide for efficient airlift generation at subsonic speeds during landing and take-off of an aircraft. Depending on set goals, the optimal shape and position of transforming section 30 relatively to main section 22 should be determined by varying the above-mentioned parameters and testing models in the wind tunnel.

Figure 6A:
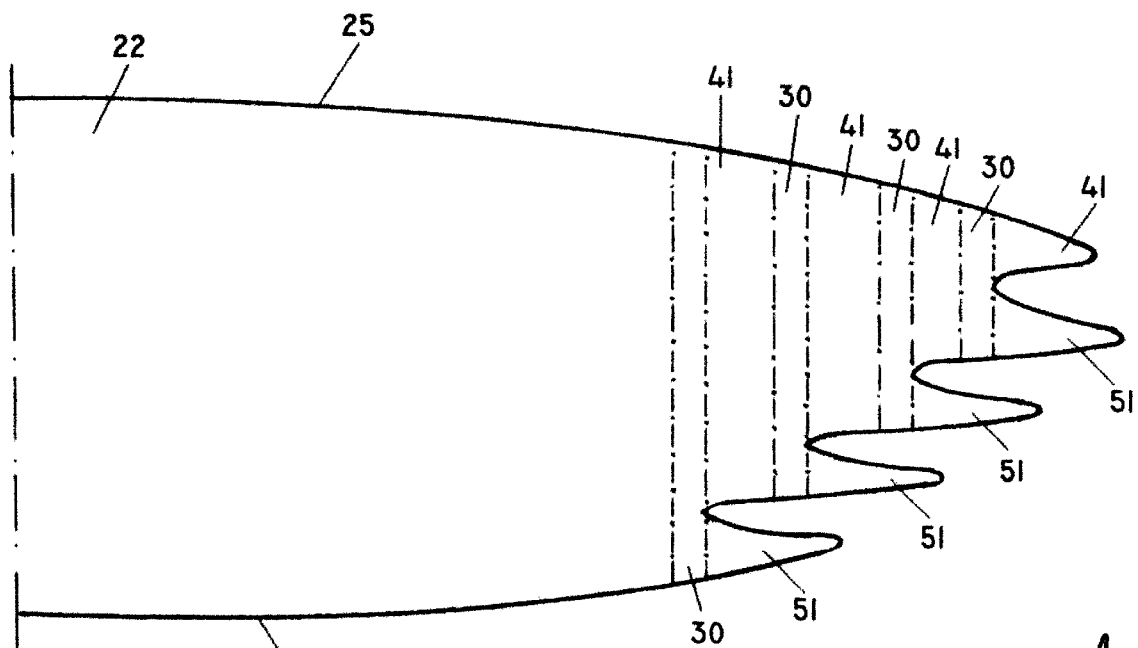
FIG. 6 shows a possibility for a multiple division of an airlifting surface.
Figure 6B:
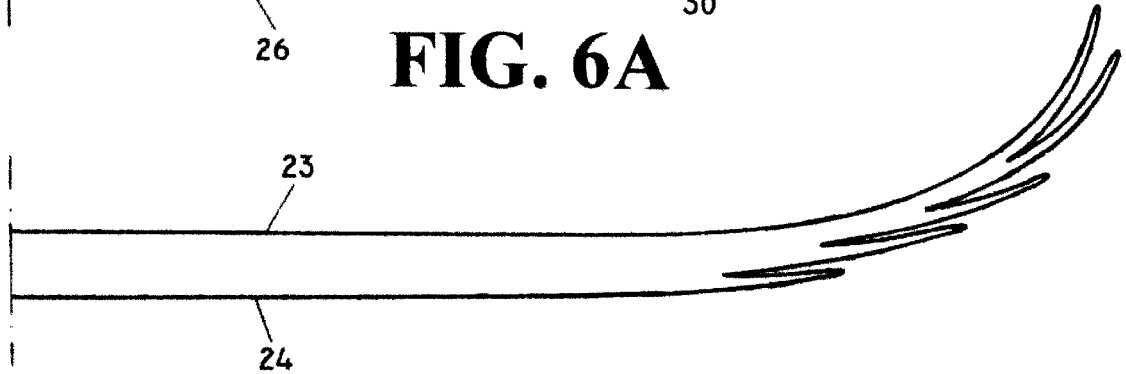

FIG. 6 shows multiple divisions of an airlifting surface with the leading sections thereof being further divided multiple times towards outboard end of the airlifting surface. In this way, it is possible to form the outboard end configuration of the airlifting surface that is similar to the shape of the eagle's wing tips during gliding.
The above-described "Airlifting-Surface-Division" idea has two different application fields:
  a) The first application field relates to the optimally shaped tips of airlifting surfaces such as aircraft wings, as well as helicopter and windmill rotor blades for the purpose of induced drag reduction.
  b) Another application field relates to new concepts of aircraft based on "Airlifting-Surface-Division" idea.
a) Application on Aircraft Wings and Helicopter and Windmill Rotor Blades FIG. 7 shows comparative images of an airlifting surface at which end a single winglet is mounted and deflected upwardly and an airlifting surface whose end is divided into a leading and a following winglet, which are also deflected upwardly. The combined surface area of the leading and following winglet equals in size the surface area of the single winglet.

Detail "A" in FIG. 7 shows the airlifting surface with the single winglet, while detail "B" shows the airlifting surface with the leading and following winglet where the combined size of their surface area, span, and maximum height thereof are equal to the surface area size, span, and maximum height of the single winglet.

In order to have the same size of the surface area, span, and the maximum winglet height of the single winglet when compared to the leading and following winglets, the single winglet must have its leading edge drastically swept back relatively to the leading edge of the main section of airlifting surface, thereby discontinuing airflow and generating a strong vortex impulse on the leading edge of the airlifting surface tip, which is spread farther down the airflow over the leading edge in the root of the single winglet.

To reduce vortex generation over the leading edge of the single winglet, it is necessary to deflect the single winglet for a very high angle relatively to the chord plane of the main section's airlifting surface, which consequently creates a narrow transition area between the upper surface of the main section and the single winglet, resulting in air pockets, turbulence, and high interference drag.

The aspect ratio of the single winglet is two times lower than the aspect ratio of the leading and following winglet, thereby doubling induced drag on the surface of the single winglet relatively to the induced drag on the surface of the leading and following winglet. The vortex generation on the leading edge of the airlifting surface, whose end is split into the leading and following winglet, as shown in detail "B" in FIG. 7, is virtually completely eliminated all the way up to the leading winglet tip. The maximum height of the leading winglet is reached already at 25% chord length of the airlifting surface tip airfoil, where the low pressure on the upper surface of the airlifting surface is at its minimum, as opposed to the maximum height of the single winglet that is reached only at 80% chord length of the airlifting surface, which is significantly reducing the vortex spread from the leading winglet tip to the main section of the airlifting surface, thereby additionally reducing the total induced drag of the airlifting surface that is equipped with the leading and following winglet in comparison to the airlifting surface with the single winglet.

The arching of the leading and following winglet in the vertical plane is gradual without sharp bends, air pockets, and turbulence, which completely eliminates interference drag between the winglets and the upper surface of the main section of the airlifting surface. Airlifting surface division is practically done in a single plane and a single point by reducing the thickness of the airlifting surface in the area of division where under surface is tangentially approaching upper surface as shown in FIG. 1. From the point of division, the following winglet is tangentially extending from the main section at a relatively low sweep angle, thereby helping retain airflow continuity. From the point of division, the following winglet trails the arching of the leading winglet in the vertical plane at the optimal distance to guide free airflow behind the leading winglet over its own surface, whereby preventing the secondary airflow towards the low-pressure area on the upper surface of the airlifting surface and reducing additionally the overall drag on the airlifting surface.

A relatively small thickness of the leading and the following winglet does not represent a drawback in comparison to the single winglet due to their arched shape as opposed to the single winglet, which has a flat shape. By using carbon-composite materials, it is possible to avoid flatters of the leading and the following winglet without additional increase in winglets weight.

FIG. 8 shows an aircraft wing whose outboard end is divided so that leading section 41 and following section 51 play the role of the leading and the following winglet respectively. Both winglets are curved and deflected from the main section chord plane upwards. In FIG. 8B, it is done by continuously curving the winglets, while in FIG. 8C, winglets are straight and bent at a cant angle in the root thereof relatively to the chord plane. The solution in FIG. 8B gives a better lift efficiency and higher rigidity of winglets, as well as lower interference drag but requires more complex manufacturing tools than the solution in FIG. 8C.

By applying the idea of Airlifting Surface Division to the classical aircraft wings, which is highly efficient in reducing induced drag, together with longer wing root chord, it is possible to shorten wing span and increase the chord length of the wing root when compared to the wings with classical winglets without negative effects on aerodynamic fineness. In this way, aerodynamic forces are significantly shifted towards wing root, which is decreasing a bending moment and simultaneously increasing structural bending resistance, thereby providing for a significantly leaner wing structure and lower weight. Lower wing structure weight would further provide for either longer aircraft range, or increase in payload, or reduction in fuel consumption. On the other hand, the shorter wing span allows for easier maneuvers of large aircraft on the runways and particularly in the vicinity of boarding gates.

FIG. 9 shows the idea of a multiple division of an airlifting surface being applied to an aircraft wing where it is possible to achieve an exceptionally high aerodynamic fineness and light wing structure, which could be applicable to the construction of gliders and especially reconnaissance aircraft.

FIG. 10 shows a helicopter rotor blade with a divided tip. The leading and following sections of the divided blade, similar to aircraft wing shown in FIG. 8, represent the leading and the following winglet of the blade. The shape, position, and the size of the winglets of helicopter rotor blades differ from the shape, position, and the size of aircraft winglets.

Since the motion of the helicopter blades is rotational, their tips are moving at highest speed and produce the largest amount of lift for which reason the basic shape of the helicopter rotor blades is rectangular without significant narrowing at their tips. On the other hand, helicopter rotor blades tips are causing a significant vortex flow that generates very high induced drag, noise, and vibrations. This completely supports the reasoning for the application of the "Airlifting-Surface-Division" idea on the helicopter rotor blades by which it is possible to preserve entirely the aerodynamic efficiency of the rotor blade tips with a simultaneous significant reduction in vortex generation, thereby significantly reducing the fuel consumption, noise, and vibrations. In order to maintain the maximum lift on the helicopter blade tips, the length of winglet chords must be as long as possible, and winglets should be slightly arched relative to the blade chord plane.

The shape of winglets for helicopter rotor blades is shown on detail "A", FIG. 10 in two versions "a" and "b". The shape shown in version "a" provides for a better aerodynamic efficiency of the helicopter rotor blades. The optimal shape and position of the winglets for helicopter rotor blades need to be determined by testing the blades in the wind tunnel and varying geometric parameters of the winglets.

FIG. 11 shows a windmill rotor blade with a divided tip. The main motion of windmill rotor blades is rotational, which is similar to helicopter rotor blades. However, the windmill rotor function is significantly different. While helicopter rotor blades are moved by the engine-generated torque in order to transform engine power into lift necessary to elevate a helicopter, windmill rotor blades transform the energy of the wind into torque necessary to move turbine generators and produce power.

Induced drag on the windmill blade tips has a significantly greater influence on wind energy absorption than active lifting forces do due to the chord position of windmill blade tips relatively to the plain of rotation. Therefore, the general shape of windmill blades, as well as the winglets shape and their size is different from helicopter rotor blades. Hidden lines in FIG. 11 are used to show the most favorable shape of a windmill rotor blade, which is elliptical with a significant narrowing at the tip thereof in order to reduce the negative drag influence as much as possible.

By applying "Airlifting-Surface-Division" idea and by optimizing the shape of the winglets on windmill rotor blades, it is possible to significantly reduce vortices and negative drag influence by which a positive torque moment would be maintained on the tip of the windmill blade. For this reason, it would be possible to increase the chord of the windmill blade tips, thereby generating a significantly greater torque and power. Winglets of windmill rotor blades have a significantly greater aspect ratio than winglets of helicopter rotor blades. They are also curved to a higher degree in the vertical plane than winglets of helicopter rotor blades. By choosing the optimal shape and the position of the winglets on the windmill rotor blade tips, it is possible to increase the absorption of wind energy for more than 50% when compared to the classical elliptically shaped blades. The optimal shape, size, and position of the winglets of windmill rotor blades should be selected after testing their models in a wind tunnel.

b) Application on New-concept Aircraft

Former concepts of aircraft based on the idea of "flying wing" used wings of different shapes without fuselage and tailplane. The main advantage of that concept over the classical concept, which includes fuselage, is the elimination of the parasitic drag of the fuselage. However, all of the former concepts that were based on the flying-wing idea had two main drawbacks due to which reasons these ideas did not find wide practical applications especially in civil aviation.

Primarily, this relates to the insufficient longitudinal stability of such aircraft, as well as insufficient pitch maneuver, which is essential for safety of any aircraft.

The second drawback is related to the need to use airfoils in the payload zone that have a large relative thickness with significantly shifted maximal thickness forward, which at higher subsonic speeds is causing local shock waves and significant wave drag increase.

Both of these disadvantages would be eliminated on the aircraft that are based on the flying wing idea when coupled with the idea of "Airlifting Surface Division".

FIG. 12 shows a new concept of the aircraft based on the "Airlifting-Surface-Division" idea, where main section 22 and transforming section 30 represent a main body of the aircraft, leading section 41 represents external wings of the aircraft, and following section 51 plays the role of the tailplane of the aircraft. This concept is very favorable to be used for large high subsonic civil and cargo aircraft, as well as high subsonic strategic bombers with extremely long range.

The main body would represent the main lifting surface inside which payload would be situated. Due to very long chords of the main lifting surface, it would be possible to dispose of bulky payload therein with relatively thin airfoils thereof.

Leading section 41, which plays the role of aircraft external wings, would produce additional lift, but their main role would be intended for roll maneuver and lateral stabilization by using flaperons along the entire span thereof. The root portion of the external wings is favorable to be used for fuel tanks disposal. By using the same idea, the external wing tip would be divided in leading and following winglet, thereby significantly increasing external wings aspect ratio and reducing induced drag. Requirements for a sufficient longitudinal stability and very efficient pitch maneuver of the aircraft would be met due to a long distance between following section 51 and the aircraft's center of gravity.

FIG. 13 shows a possibility for the integration of jet engines into aircraft airframe in the area of transforming sections 30, which would additionally reduce the overall aircraft drag. In this case, transforming section upper surface 31, aft of point of division 35, is gradually transforming itself into a convex oval curvature in the direction of the transverse axis. By using the existing deformation, transforming section under surface 32 is divided in inner portion 61 and outer portion 62 starting from point of division 35 on the outboard end of transforming section 30 and somewhat forward from point of division 35 on the inboard end of transforming section 30. The inner portion 61 is arching upward and downward down the airflow until it creates the oval engine air inlet. Outer portion 62 follows the bottom side of inner portion 61 and forms an air inlet lip where it meets the inner portion 61. Farther away, towards transforming section trailing edge 34, outer portion 62 is gradually transforming itself into a convex curvature in the direction of transverse axis, thereby providing together with transforming section upper surface 31 space for jet engine disposal.

The integrated air inlet and convexly deformed outer portion 62 on the bottom side, as well as the convexly deformed rear portion of transforming section upper surface 31 with the vertical stabilizer on the upper side of the aircraft shown in FIG. 13, separate the airflow over main section 22 from the airflow over following section 51, which allows for a discontinuity of the shapes and dislocation of following section 51 relatively to main section 22 without airflow disturbance especially on the upper side. This allows for a possibility to move following section trailing edge 55 significantly rearward relatively to main section trailing edge 26, thereby additionally increasing the stabilizing effect of following section 51, as well as the pitch maneuver of aircraft.

The airframe of rear portion of transforming section 30, which is bounded by transforming section upper surface 31 being convexly shaped on the upper side and by outer portion 62, which is convexly shaped on the under side, has a large shape resistance and allows conduction of inertial and aerodynamic forces from following section 51 to main section 22 without increase in aircraft weight.

The process of air inlet formation is shown in FIG. 14.

FIG. 15 shows comparative images between "Blended Wing Body" (BWB) aircraft concept based on the original "flying-wing" concept and an aircraft whose concept is based on the "Airlifting-Surface-Division" idea where both aircraft are double-deckers and have the same passenger capacity. Based on FIG. 15, it is evident that the passenger accommodation is more favorable with the new concept aircraft when compared to BWB since passengers are closer to the symmetry axis likewise classical-concept aircraft. In order to provide for passenger accommodation of a double-decker aircraft, BWB must use a minimum 15% airfoil in the symmetry axis, and a minimum 21% airfoil on its outboard end. The new-concept aircraft would use a laminar 12% airfoil in the symmetry axis and only 13% airfoil on the outboard end, which allows for high subsonic speeds without generating wave drag. Fuel as the variable load of the new-concept aircraft is disposed in the root section of the external wing and completely separated from the passenger area by means of transforming section, which is used for luggage disposal. BWB has very limited options to dispose of fuel at a safe distance from the passenger area.

Fuel gravity center of the new-concept aircraft in the longitudinal direction practically coincides with aircraft gravity center. Fuel consumption during the flight does not affect aircraft gravity center. On the other hand, the only space available for fuel disposal in the vicinity of BWB gravity center is below passenger area, which is very dangerous in case of emergency landing. Mass and airlifting forces distribution for the new-concept aircraft are more favorable when compared to BWB due to BWB's large wing span, thus allowing for lower structural weight.

The distribution of aerodynamic surfaces of a new-concept aircraft including a tailplane of a large surface area that is located at a significant distance from the aircraft gravity center meets longitudinal stability requirements and provides for a realistic project, which is not the case with the BWB aircraft. The tailplane location of the new-concept aircraft and the size thereof is such that the pitch momentum of such an aircraft is twice larger than the one of the BWB aircraft, thereby providing for much better pitch maneuver and safety of the new-concept aircraft.

The larger extra lift means on the trailing edge of the new-concept aircraft provide for the overall larger lift, lower speed, and shorter runway in the landing phase than the BWB aircraft can provide for.

A relatively low aspect ratio of external wings of the new-concept aircraft would not represent a disadvantage from the aspect of induced drag due to low specific loading of wings and incorporation of leading and following winglets on the external wing tips.

A shorter wing span of the external wings of the new-concept aircraft relatively to BWB concept aircraft, which negatively affects roll maneuver at low speeds, could be eliminated by incorporating slot forming segments and slot changing spoilers on the trailing edge of the external wings behind fuel tanks. This idea is reflected in the Patent "Slot Forming Segments and Slot Changing Spoilers" (U.S. Pat. No. 6,328,265).

The outer dimensions of the new-concept aircraft for about 800 passengers would be:

Overall length-61.5 m; wing span-60.6 m; lifting surface area excluding tailplane-1,364 sq. m. By comparing the outer dimensions of the new-concept aircraft for 800 passengers with Blended Wing Body (BWB) for 800 passengers, A-380 with 570 passengers, and B 747-400 with capacity of 450 passengers, it is evident that:

Wing span is shorter by 26.1 m, 19.2 m, and 3.7 m when compared to BWB, A380, and Boeing 747-400 respectively.

The overall length is longer when compared to BWB by 8.3 m but shorter by 11.5 m and 9.16 m when compared to A380 and Boeing 747-400 respectively.

Lifting surface area is similar in size to BWB's but greater by 1.6 and 2.7 times when compared to A380 and Boeing 747-400 respectively, which provides for a low specific loading of the airlifting surfaces, as well as low induced drag.

As it is evident above, the outer dimensions of the new-concept aircraft are even smaller than the ones of Boeing 747-400 that has almost two times smaller passenger capacity, which enables such an aircraft to have easy maneuvering on runways and during its approach to gates especially when compared to BWB and A-380 that have their wing span greater by 26.1 m and 19.2 m respectively.

In addition to the above-mentioned advantages of the new-concept aircraft, which is based on the idea of flying wing and Airlifting Surface Division, it would be possible to reduce fuel consumption per passenger mile almost three times when compared to classical concept aircraft. Also, the new concept aircraft has significantly increased range when compared to classical concept aircraft.

FIG. 16 shows an aircraft concept where main section 22 together with the transforming section 30 represent the main lifting surface of the aircraft wherein payload and fuel are disposed. Leading section 41 is having the role of canards, and following section 51 is having the role of external wings and main stabilizing surfaces. This concept would be mainly used for aircraft flying at supersonic and hypersonic speeds, as well as space shuttle concept with horizontal take-off where the aircraft gravity center is significantly shifted in the aft direction due to usage of airfoils with a sharp leading edge.

FIG. 17 shows a new concept of supersonic and hypersonic aircraft, as well as space shuttle with a horizontal take-off that would use Ramjet and Scramjet engines instead of external solid booster rockets for the atmospheric portion of the flight. Jet engine air inlets that use kinetic and heat energy of the air created by the shock waves would be located on the under surface of the craft in the area of the transforming section 30, aft of point of division 35. By using Ramjet and Scramjet engines and by eliminating the need for carrying the oxidizer, the fuel weight would be significantly reduced and payload significantly increased. The space shuttle built upon this concept would justify routine flights into the Earth's orbit similarly as it is the case today with routine flights in civil aviation. This new concept could be also used for supersonic passenger aircraft and hypersonic strategic bombers.

We claim:

1. An airlifting surface assembly being shaped for subsonic speed having a longitudinal and a transverse axis, said longitudinal axis coinciding with the direction of airflow, said airlifting surface assembly comprising: a main section, a transforming section, a leading section, and a following section, said main section extending along said transverse axis and having an upper and an under surface, a leading and a trailing edge, the main section upper and under surfaces having smooth and continuous curvatures, said transforming section being joined the outboard end of said main section and extending along said transverse axis, said transforming section having an upper and an under surface, a leading and a trailing edge, the transforming section upper surface having a smooth and continuous curvature and being tangentially joined said main section upper surface, the transforming section leading and trailing edges being tangentially joined the main section leading and trailing edges respectively, the transforming section under surface being tangentially joined said main section under surface, said transforming section under surface gradually bulging up towards said transforming section upper surface from the transforming section inboard end to the transforming section outboard end, thereby forming one concave and two convex curvatures in the direction of airflow, the vertex of said concave curvature approaching said transforming section upper surface and joining it on said transforming section outboard end in a point of division, thus dividing said transforming section into said leading and said following section, said leading section extending along said transverse axis and having an upper and an under surface, a leading and a trailing edge, and a trailing edge strake, the leading section upper and under surfaces having smooth and continuous curvatures and being tangentially joined said transforming section upper and under surfaces respectively, the leading section leading edge being tangentially joined said transforming section leading edge, said following section extending along said transverse axis and having an upper and an under surface, a leading and a trailing edge, and a leading edge strake, the following section upper and under surfaces having smooth and continuous curvatures and being tangentially joined said transforming section upper and under surfaces respectively, the following section trailing edge being tangentially joined said transforming section trailing edge, the leading section trailing edge strake is joined the following section leading edge strake in said point of division, said main and transforming sections being a main portion of said airlifting surface assembly, said leading section being a fore winglet, and said following section being an aft winglet of said airlifting surface assembly, said fore and aft winglets are differentially arching upward in the direction that is perpendicular to said longitudinal and transverse axes with said aft winglet trailing said fore winglet, whereby significantly reducing induced and interference drag of said airlifting surface assembly.

2. An airlifting body being shaped for subsonic and transonic speed having a plane of symmetry and a transverse axis that is perpendicular to said plane of symmetry, said plane of symmetry being defined by a longitudinal and a vertical axis, said longitudinal axis coincides with the direction of airflow, said airlifting body comprising: a main section, two mutually symmetrical transforming sections, two mutually symmetrical leading sections, and two mutually symmetrical following sections, said main section extending along said transverse axis on both sides of said plane of symmetry, said main section having an upper and an under surface, a leading and a trailing edge, the main section upper and under surfaces having smooth and continuous curvatures, said transforming sections join the outboard ends of said main section, each of said transforming sections extending along said transverse axis and having an upper and an under surface, a leading and a trailing edge, the transforming section upper and under surfaces sharing a point of division, said point of division being disposed on the transforming section outboard end, said transforming section upper surface having a smooth and continuous curvature and being tangentially joined said main section upper surface, said transforming section under surface being tangentially joined said main section under surface, said transforming section under surface gradually bulging tip towards said transforming section upper surface from the transforming section inboard end to said transforming section outboard end, thereby forming one concave and two convex curvatures in the direction of airflow, the vertex of said concave curvature approaching said transforming section upper surface and shifting toward said point of division in the direction of said longitudinal axis, said vertex is joined said transforming section upper surface in said point of division, thus dividing said transforming section into said leading and said following section, said leading and following sections extending along said transverse axis, each of said leading sections having an upper and an under surface, a leading and a trailing edge, and a trailing edge strake, said leading section upper and under surfaces having smooth and continuous curvatures and being tangentially joined said transforming section upper and under surfaces respectively, the leading section leading edge being tangentially joined said transforming section leading edge, each of said following sections having an upper and an under surface, a leading and a trailing edge, and a leading edge strake, the following section upper and under surfaces having smooth and continuous curvatures and being tangentially joined said transforming section upper and under surfaces respectively, said leading edge strake being joined said trailing edge strake in said point of division, said main section with said transforming sections being a main airlifting surface of an airplane, said leading sections being external fore airlifting surfaces of said airplane, and said following sections being external aft airlifting surfaces of said airplane, whereby significantly reducing overall drag and simultaneously providing for a sufficient pitch maneuver and longitudinal stability of said airplane.

3. The airlifting body of claim 2, wherein said transforming section under surface being divided into an inner and an outer portion beginning from said point of division on said transforming section outboard end and in front of aid point of division on said transforming section inboard end, said inner portion progressively arching on both lateral ends thereof in the direction of said transverse axis down the airflow with both lateral ends of said inner portion gradually approaching each other until said lateral ends are joined together aft of said point of division, thus forming a closed oval inlet of a jet engine, said outer portion following the lower surface of said inner portion and forming with it a lip of said air inlet, said transforming section upper surface slightly bulging up from said point of division down the airflow relatively to said main section upper surface, said following section upper surface with said outer portion providing for necessary space to integrate said jet engine into airframe of said aircraft, whereby additionally reducing the overall drag of said aircraft.

4. An airlifting body being shaped for hypersonic speed having a plane of symmetry and a transverse axis that is perpendicular to said plane of symmetry, said plane of symmetry is defined by a longitudinal and a vertical axis, said longitudinal axis coinciding with the direction of airflow, said airlifting body comprising: a main section, two mutually symmetric transforming sections, two mutually symmetric leading sections and two mutually symmetric following sections, said main section extending along said transverse axis on both sides of said plane of symmetry, said main section having an upper and an under surface, a leading and a trailing edge, the main section upper and under surfaces having smooth and continuous curvatures, said transforming sections join the outboard ends of said main section, each of said transforming sections extending along said transverse axis and having an upper and an under surface, a leading and a trailing edge, the transforming section upper and under surfaces sharing a point of division, said point of division being disposed on the transforming section outboard end, said transforming section upper surface having a smooth and continuous curvature and being tangentially joined said main section upper surface, the transforming section leading edge being tangentially joined the main section leading edge, said transforming section under surface being joined said main section under surface in one continuous line in the direction of airflow, said transforming section under surface gradually bending upward from the transforming section inboard end to said transforming section outboard end, thus forming a concave bend in the direction of airflow, the vertex of said concave bend approaching said transforming section upper surface and shifting toward said point of division in the direction of airflow, said vertex being joined said transforming section upper surface in said point of division, thus dividing said transforming section into said leading and said following section, said leading and following sections extending along said transverse axis, each of said leading sections having an upper and an under surface, a leading and a trailing edge, the leading section upper surface having a smooth and continuous curvature and being tangentially joined said transforming section upper surface, the leading section under surface is joined said transforming section under surface in one continuous line in the direction of airflow, the leading section leading edge being tangentially joined said transforming section leading edge, each of said following sections having an upper and an under surface, a leading and a trailing edge, the following section upper surface having a smooth and continuous curvature and being tangentially joined said transforming section upper surface, the following section under surface is joined said transforming section under surface in one continuous line in the direction of airflow said main section with said transforming sections being a main airlifting surface of a hypersonic airplane, said teading sections being external fore airlifting surfaces of said airplane, and said following sections being external aft airlifting surfaces of said airplane, whereby significantly increasing lift versus drag ratio and simultaneously providing for a sufficient longitudinal stability and pitch maneuver of said airplane.

* * * * *